US011263060B2

(12) United States Patent
O'Donncha et al.

(10) Patent No.: US 11,263,060 B2
(45) Date of Patent: Mar. 1, 2022

(54) DYNAMIC DISTRIBUTION OF LOADS ACROSS HETEROGENEOUS COMPUTING STRUCTURES IN COMPUTATIONAL RENDERING

(71) Applicant: INTERNATIONAL BUSINESS MACHINES CORPORATION, Armonk, NY (US)

(72) Inventors: Fearghal O'Donncha, Aran Islands (IE); Emanuele Ragnoli, Mulhuddart (IE); Albert Akhriev, Mulhuddart (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/690,269

(22) Filed: Nov. 21, 2019

(65) Prior Publication Data

US 2021/0157654 A1    May 27, 2021

(51) Int. Cl.
| | | |
|---|---|---|
| G06F 9/50 | (2006.01) | |
| G06F 9/54 | (2006.01) | |
| G06T 1/20 | (2006.01) | |
| G06F 8/41 | (2018.01) | |
| G06F 8/71 | (2018.01) | |
| G06F 9/38 | (2018.01) | |

(52) U.S. Cl.
CPC ............ *G06F 9/5083* (2013.01); *G06F 8/451* (2013.01); *G06F 8/71* (2013.01); *G06F 9/3885* (2013.01); *G06F 9/541* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 7,212,207 B2 | 5/2007 | Green et al. | |
| 8,704,837 B2 | 4/2014 | Harper et al. | |
| 2009/0160867 A1 | 6/2009 | Grossman | |
| 2011/0122135 A1* | 5/2011 | Kim | ........................ G06T 1/20 |
| | | | 345/426 |
| 2015/0347107 A1* | 12/2015 | Munshi | ..................... G06F 8/47 |
| | | | 717/147 |
| 2019/0304162 A1* | 10/2019 | Bakalash | ................ G06T 15/04 |

FOREIGN PATENT DOCUMENTS

CN    104965761 B    11/2018

OTHER PUBLICATIONS

Jordan et al, 'The AllScale Runtime Application Model', 2018 IEEE International Conference on Cluster Computing, pp. 445-455, (Sep. 2018).*

(Continued)

*Primary Examiner* — Patrick F Valdez
(74) *Attorney, Agent, or Firm* — Griffiths & Seaton PLLC

(57) ABSTRACT

Embodiments for dynamically distributing loads in computational rendering in a computing environment. A computational rendering model on a computational rendering to exploit nested recursive parallelism within a heterogenous computing architecture to enable communication overlap, memory transfer, and data and task management, wherein the computational rendering model is developed for the heterogenous computing architecture.

14 Claims, 10 Drawing Sheets

(56) References Cited

OTHER PUBLICATIONS

Jordan et al, 'D2.3—AllScale System Architecture', [online], [retrieved Jan. 7, 2021], http://www.insieme-compiler.org/pub/allscale_D2.3_system_architecture.pdf, ( Mar. 1, 2017).*
Hendricks et al, 'The AllScale Runtime Interface—Theoretical Foundation and Concept', 2016 9th Workshop on Many-Task Computing on Clouds, Grids, and Supercomputers, pp. 13-19. (Year: 2016).*
Brodtkorb et al, 'GPU computing in discrete optimization. Part I: Introduction to the GPU', EURO J Transp Logist, 2:129-157. (Year: 2013).*
Fahringer T., 'Allscale: An Exascale Programming, Multi-objective Optimisation and Resilience Management Environment Based on Nested Recursive Parallelism'; EXDI Workshop, Prague. (Year: 2016).*
"Porting Existing Cache-Oblivious Linear Algebra HPC Modules to Larrabee Architecture", Heinecke, Alexander et al., Proc. 7th Conf. on Computing Frontiers, 2010, May 17-19, 2010, pp. 91-92, accessed Apr. 30, 2019 6:04 PM EST.
"Hardware-Oriented Implementation of Cache Oblivious Matrix Operations based on Space-Filling Curves",Bader M. el al., 7th Int. Conf. Parallel Processing and Applied Mathematics (PPAM '07), vol. 4967, Lecture Notes in Computer Science, Springer: Heidelberg, 2008; pp. 628-638, accessed Apr. 30, 2019 6:04 PM EST, (11 Pages).

* cited by examiner

DYNAMIC DISTRIBUTION OF LOADS ACROSS HETEROGENEOUS COMPUTING STRUCTURES IN COMPUTATIONAL RENDERING

GOVERNMENT LICENSE RIGHTS

The project leading to this application has received funding from the European Union's Horizon 2020 research and innovation programme under Grant Agreement No. 671603.

BACKGROUND OF THE INVENTION

Field of the Invention

The present invention relates in general to computing systems, and more particularly, to various embodiments for dynamic distribution of loads across heterogenous computing structures in a computational rendering in a computing environment.

Description of the Related Art

Computing systems may be found in the workplace, at home, or at school. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. Due to the recent advancement of information technology and the growing popularity of the Internet, for example, a wide variety of computer systems have been used in frameworks for controlling and managing graphics processing units (GPUs) such as, for example, in generating a photorealistic or non-photorealistic image from a model.

SUMMARY OF THE INVENTION

Various embodiments for dynamic distribution of loads across heterogenous computing structures in computational rendering in a computing environment by one or more processors are described. In one embodiment, by way of example only, a method for exploiting nested recursive parallelism within a heterogenous architecture applied to computational rendering by executing a computational rendering model, again by one or more processors, is provided. A computational rendering model on a computational rendering to exploit nested recursive parallelism within a heterogenous computing architecture to enable computation and communication overlap, memory transfer, and data and task management, the computational rendering model is developed for the heterogenous computing architecture.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
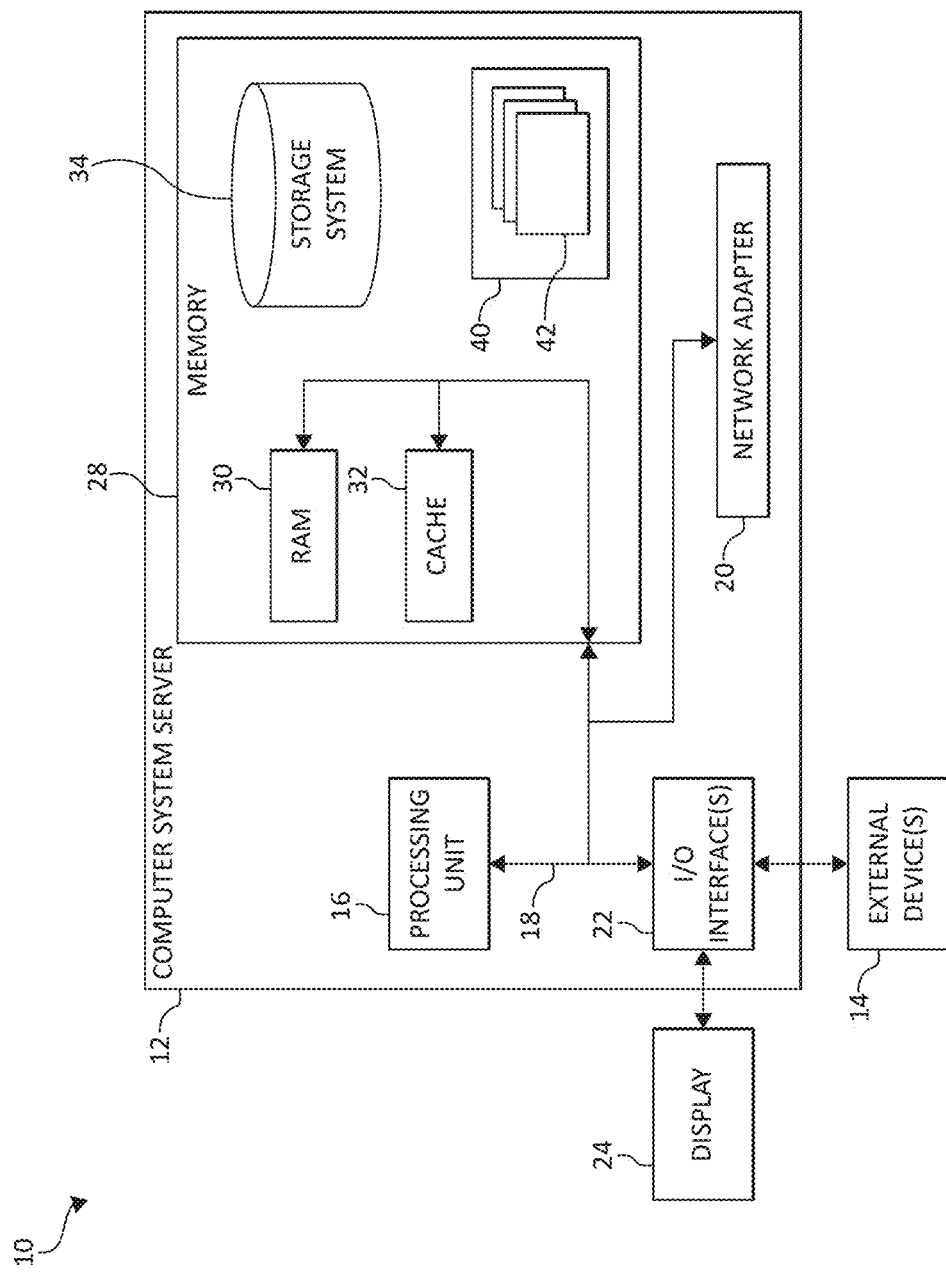
FIG. 1 is a block diagram depicting an exemplary cloud computing node according to an embodiment of the present invention.

Rending (e.g., computer graphics) or image synthesis is the automatic process of generating a photorealistic or non-photorealistic image from a two-dimensional ("2D") or three-dimensional ("3D") model or models. A graphics processing unit ("GPU") is a device used to assist a central processing unit ("CPU") in performing complex rendering calculations. In computer graphics, a rending equation is an integral equation in which the equilibrium radiance leaving a point is given as the sum of emitted plus reflected radiance under a geometric optics approximation and can be expressed as the following equation:

$$L_o(p,\omega_o) = L_e(p,\omega_o) + \int_{H^2} f_r(p,\omega_i \to \omega_o) L_i(p,\omega_i) \cos\theta \, d\omega_i \quad (1),$$

where $L_o$ is outgoing/observed radiance, p is a point of interest, $\omega_o$ is direction of interest, $L_e$ is emitted radiance (e.g., light source), $H^2$ is all directions in hemisphere, $f_r$ is a scattering function, $L_i$ is the incoming radiance, $\omega_i$ is the incoming direction, and $\theta$ is the angle between incoming direction and normal. Solving the rendering equation for any given scene is a primary challenge in realistic rendering. That is, a key challenge is, in evaluating the incoming radiance, another integral equation is required to be determined/computed (i.e., rendering equation is recursive) and is computational expensive.

Currently, the rendering equation is solved on GPUs using specially coded implementations (e.g. CUDA). Some interfaces explore multi-CPU and multi-GPU systems with task multi-versioning (e.g., requires two versions of the same code, one for CPU and one for GPU). High-level frameworks have been proposed to explore use of CPUs and GPUs with the CPUs and GPUs allowing high level abstractions such as, for example, parallel loops. However, these frameworks fail to simultaneously provide use of multiple CPUs and multiple GPUs. Said differently, current systems only considers flat parallelism which exacerbates load imbalances (i.e. synchronization of solution at end of each timestep before proceeding) and optimization only considers overlapping computation and communication. Also, the computational expense and costs of cache misses are not addressed except in simplified, manually intensive approaches. Any automated approaches are largely problem specific and dependent on the sampling strategies adopted. Some approaches consider reordering of rays to increase the geometry of cache access. However, this introduces shader limitations.

Additionally, a computational stencil defines an n-dimensional spatial grid at time t as a function of neighboring grid elements at time such as, for example t−1, . . . , t−k. This n-dimensional grid plus the time dimension span an (n+k)-dimensional spacetime the results of which can be computed by means of a computational kernel. This has proven valuable in developing more efficient algorithms that better optimize memory access via cache-oblivious algorithms. Considering a 3-point stencil in 1-dimensional space (2-dimensional spacetime), since the computation of a point at time t depends only upon three spatial points at time t−1, it is sufficient to store only these 3 points to compute the next point in time for grid point n (i.e. $n_t$ is a function only of $n-t_{t-1}$, $n_{t-1}$, and $n_{t-1}$). More recently this has provoked interest in HPC to enable highly efficient and scalable parallel computations that are agnostic to the underlying hardware and data locality via nested recursive parallelism (i.e. based on knowledge of the solution dependency at each point in space the solution stored in memory can be managed more effectively allowing for optimizing computation).

Additionally, photorealism is unachievable in real-time rendering environments largely due to the immense computational burden. Much of the improvement has rested on development made by both graphics card manufacturers and development of GPU friendly, highly parallel physical simulation algorithms. However, parallelism challenges facing computational rendering include, for example, 1) large data volumes require distribution of data across processors (e.g., cannot be held within one "master" processor), 2) data access patterns are unpredictable which impacts traditional caching strategies, and 3) load patterns are variable while traditional profiling approaches make assumptions based on average loads.

Performance is further impacted by incoherent cache access patterns exacerbated during the rendering of curved objects. Reflection and refraction rays will go in every direction, and these rays are incoherent thus causing a geometry cache of limited size to trash. Addressing these challenges requires a localized parallelization strategy with dynamic load balancing and managed communication to minimize cache misses. A key prerequisite is a parallel toolchain with control over the work and data to enable management of task distribution.

Thus, a need exists for nested recursive parallelism with heterogeneous load-balancing as central to the development of scalable parallel algorithms that effectively exploit these resources. Accordingly, the present invention relates to a HPC application to provide automated integration of the solution to the rendering integral with heterogeneous architectures (e.g., a CPU and a GPU) for computational rendering so as to improve the usage of the data cache is of vital importance to improve the performance of the heterogenous architecture, rendering equation.

In one aspect, various embodiments are provided for exploiting nested recursive parallelism within a heterogenous architecture applied to computational rendering by executing a computational rendering model. A computational rendering model on a computational rendering to exploit nested recursive parallelism within a heterogenous computing architecture to enable computation and communication overlap, memory transfer, and data and task management, the computational rendering model is developed for the heterogenous computing architecture.

In an additional aspect, nested recursive parallelism within heterogeneous architecture (e.g., one or more CPUs and one or more GPUs) is exploited and applied to computational rendering. In one aspect, nested recursive parallelism enables the unlooping of computational algorithms from a space decomposition (i.e. solving concurrently over points in space) to a spacetime decomposition (i.e. solving concurrently over points in space and time by managing the dependencies of the solution at each spatial point on its neighbors.

A user-level application programming interface ("API") such as, for example, an Allscale API may be used and is capable of expressing specific parallel primitives by constructing for expressing the code in terms of data structures, parallel control flows, and synchronization operations. It should be noted that "Allscale" may refer/mean a unified, recursive (in space and time) parallel programming model coupled with advanced, parallelism- and context-aware compiler and runtime optimization that provides the potential for productive development of software applications that are more computationally scalable.

A compiler (e.g., a context-aware compiler or "Allscale" compiler) analyzes recursive primitive usage, data access and generating multiple code version targeting different architectures. A runtime system (e.g., an Allscale runtime system) manages available hardware resources and distribution of workload and data structures to compute resources and/or manages assignment of tasks to processors and GPU, the location of data elements in the system, and hardware parameters such as GPU usages or the frequency of cores. It should be noted that the runtime system and the compiler create a complete parallel toolchain (e.g., context-aware compiler and runtime system with dynamic optimization) which is provided/exposed to a developer via an API.

Again, "AllScale" is a programming environment targeting development of highly scalable parallel applications by siloing development responsibilities. The AllScale programming environment aims to automatically/dynamically separate development responsibilities between domain scientists, HPC experts and system level experts by providing a well-defined bridge between each of their worlds. AllScale provides a simple development API to domain expert (e.g., domain scientist) developers. The bridge provided by the AllScale API consists of two parts that represent the basic building blocks of every parallel algorithm: 1) parallel control flow primitives and 2) data structures. A user API (e.g., a front-end AllScale API) provides an application code (e.g., C++ code) development environment and a suite of parallel constructs denoting tasks to be operated concurrently. Lower level tasks related to the machine and system level may be managed by the AllScale toolchain (e.g., context-aware compiler and runtime system with dynamic optimization) at the core level.

That is, the present invention provides for dynamic distribution of loads across heterogenous computing structures in computational rendering by deploying a computational rendering model tuned for heterogeneous architectures (e.g., a CPU and a GPU). A context-aware compiler may attach meta-descriptors on workload and data distribution to runtime system code. The runtime system maintains automated control over workload and data distribution across compute resources. Using the runtime system, a cache oblivious implementation may be used to reduce occurrences of costly cache misses. Dynamic scheduling may split and partition tasks (e.g., split tasks across cores and nodes) cognizant of the work and data access patterns. The computational rendering model may be executed to exploit nested recursive parallelism to 1) overlap communication and memory transfers, 2) allow a more flexible control over task allocation and 3) improve Cache memory access (i.e. reduce Cache misses) by automated, intelligent distribution of data and workload.

In an additional aspect, the present invention provides for 1) rendering integral may be determined/solved on a decomposed global domain (e.g. parallel ray tracing algorithm) that can be solved as Neumann series representation of the integral equation as infinity sum of integrals, 2) sampling of pixel radiance using ray tracing implementation (e.g. sampling based on path to light source) 3) using a localized termination of ray path (i.e. stop computing ray path after defined number of bounces or depth), e.g. based on probabilistic analysis of material reflectance propertied (i.e. high probability of termination if light path hits a black surface, 4) using a heterogeneous (e.g., one or more CPUs and one or more GPUs) compute architecture, 5) using a computational runtime system that enables asynchronous computations and local communication to provide independent nested recursive parallelisms 6) using a cache oblivious algorithmic implementation to reduce cache misses, and 7) providing a result of solving the rendering equation according to the nested recursive heterogenous approach as described herein and provide an output as the solution to the rendering equation faster (e.g. real-time) by exploiting capabilities for computational rendering capable of efficiently exploiting available CPU and GPU resources. That is, the output is a result of solving the rendering equation according to the nested recursive heterogenous approach as described herein and outputting real-time capabilities for computational rendering capable of efficiently exploiting available CPU and GPU resources.

In one aspect, present invention provides for the user-level application programming interface ("API") (e.g., an AllScale API), where the user or computational rendering domain expert), develops an application code according to the AllScale rules, protocols, data structures, routines, object classes. The AllScale compiler and runtime system (e.g., a software development toolchain or AllSpace API toolchain) and the code may be compiled into binaries that can be effectively managed and distributed across compute resources by the runtime system. In one aspect, by way of example only, a computational rendering expert may adopt a rendering scene. A set of independent subdomains may be split (i.e. split it into multiple domains) according to the data structures of the AllScale API. One or more instructions/solutions on synchronizations may be provided according to the protocols of the AllScale API (e.g. each domain sends its solution to its neighbors to the North, East, West and South after every computational timestep).

Within the AllScale API, each subdomain and communication schema may be developed according to the defined data structures of the API. This application code is then compiled using the AllScale compiler, which creates the binaries with meta information on data structures, synchronization protocols, compute pragmas (e.g. multithreading, GPU-execution) and communication schema. The runtime system then executes this application code across available compute resources (e.g., CPU, GPU, etc.) in a recursive parallelism approach that allows overlapping communication and computation by having the solution of subdomains at different computational time steps depending on the synchronization scheme required. It should be noted that the application code may be written in the AllScale API and provides a set of specifications for protocols, data structures, routines and object classes the developer (computational rendering domain expert) must follow. By following these specifications, the AllScale API provides an interface between the code and the AllScale toolchain (e.g., AllScale compiler and runtime system).

Said differently, a computational rendering expert may adopt a rendering scene, split the adopted rendering scene into a set of independent subdomains (i.e. split it into multiple domains), provide instructions on synchronizations (e.g. each domain must send its solution to its neighbors' to north, east, west and south after every computational timestep). Developing within the AllScale API, each subdomain and communication schema may be developed according to the defined data structures of the AllScale API. This application is then compiled using the AllScale compiler, which creates the binaries with meta information on data structures, compute pragmas (e.g. multithreading, GPU-execution) and communication schema. The runtime system then executes this code across available compute resources (CPU, GPU, etc.) in a recursive parallelism approach that allows overlapping communication and computation by having the solution of subdomains at different computational time steps depending on the synchronization scheme required.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
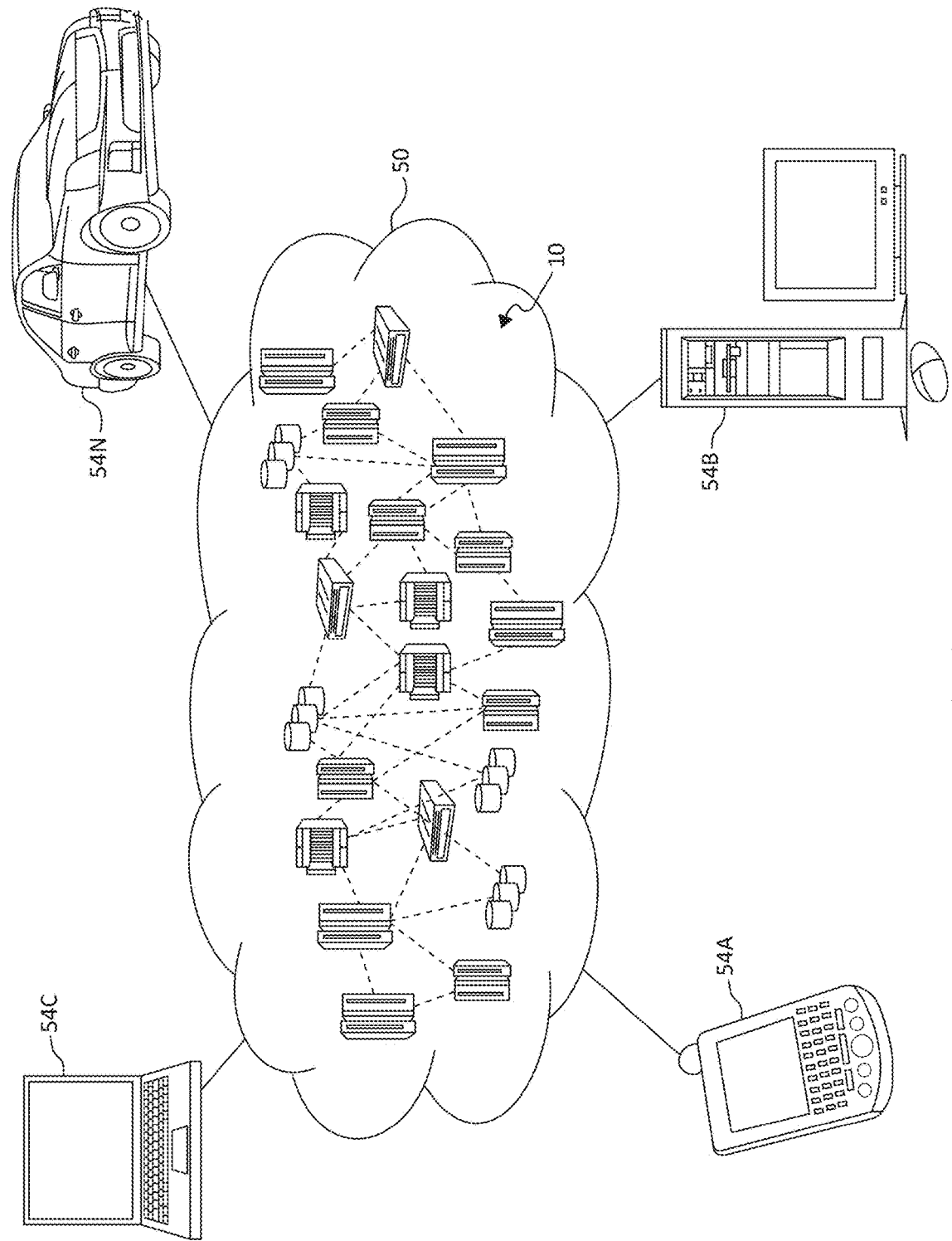
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
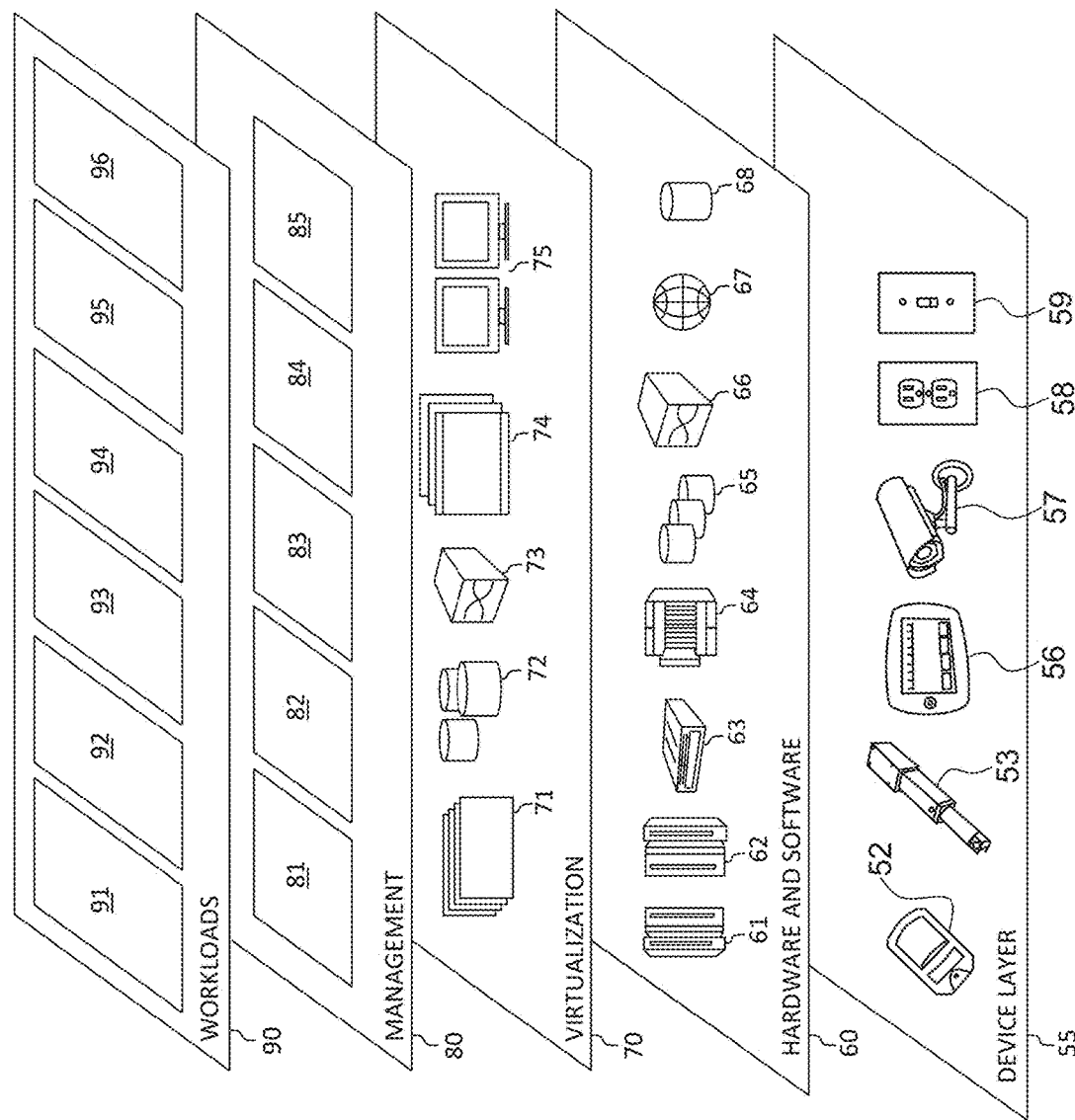
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for dynamic distribution of loads across heterogenous computing structures. In addition, workloads and functions 96 for dynamic distribution of loads across heterogenous computing structures may include such operations as data analysis, data collection and processing, and predictive and data analytics functions. One of ordinary skill in the art will appreciate that the workloads and functions 96 for dynamic distribution of loads across heterogenous computing structures may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

Figure 4:
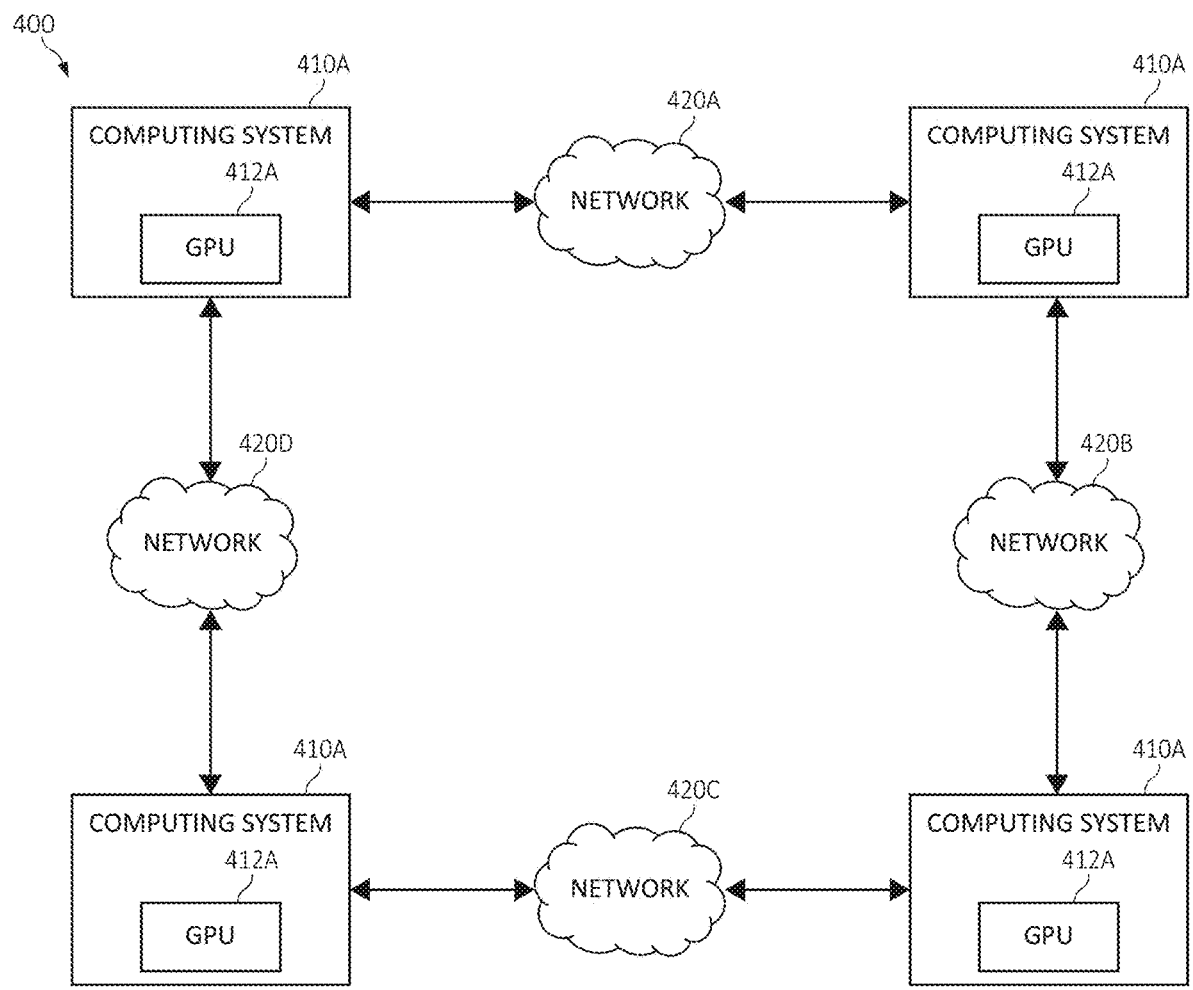
FIG. 4 is a block/flow diagram depicting heterogenous computing structure according to an embodiment of the present invention.

FIG. 4 is a functional block diagram depicting a heterogenous computing system 400 in accordance with some embodiments of the present invention. As depicted, heterogenous computing system 400 includes computing systems 410A, 410B, 410C, and 410D (e.g., computing system 12 of FIG. 1) and a plurality of networks 420A, 420B, 420C, and 420D. The heterogenous computing system 400 may be a multidimensional reduction system that enables improved efficiency in communication within a deep learning environment.

Computing systems 410A, 410B, 410C, and 410D can be desktop computers, laptop computers, specialized computer servers, or any other computer systems known in the art. In some embodiments, computing systems 410A, 410B, 410C, and 410D represent computer systems utilizing clustered computers and components to act as a single pool of seamless resources. In general, computing systems 410A, 410B, 410C, and 410D are representative of any electronic devices, or combinations of electronic devices, capable of executing machine-readable program instructions.

As depicted, each computing system 410A, 410B, 410C, and 410D includes one or more graphics processing unit (GPU) 412A, 412B, 412C, and 412D, respectively. Each GPU 412A, 412B, 412C, and 412D is a circuit designed to manipulate and alter memory to facilitate creation of images for display. In at least one embodiment, GPUs 412A, 412B, 412C, and 412D are configured to execute computational rendering algorithms.

Each of networks 420A, 420B, 420C, and 420D, can be, for example, a local area network (LAN), a wide area network (WAN) such as the Internet, or a combination of the two, and include wired, wireless, or fiber optic connections. In general, networks 420A, 420B, 420C, and 420D can be any combination of connections and protocols that will support communications between computing systems 410A, 410B, 410C, and 410D in accordance with an embodiment of the present invention. In at least one embodiment of the present invention, networks 420A, 420B, 420C, and 420D facilitate data transmissions between computing systems 410 within a deep learning system 400.

The computing systems 410A, 410B, 410C, and 410D may each individually be a heterogenous computing architecture (e.g., one or more CPUs and one or more GPUs). Alternatively, the computing systems 410A, 410B, 410C, and 410D may collectively form a heterogenous computing architecture (e.g., one or more CPUs and one or more GPUs).

As previously mentioned, the mechanisms of the illustrated embodiments provide novel approaches for exploiting nested recursive parallelism within heterogeneous architecture applied to computational rendering. A computational rendering model may be used. A user or automated description of data and grid structures representing compute variables (i.e. enabling control over distribution of work and data) may be identified and used. A software development toolchain (e.g., an Allspace API toolchain) capable of achieving automated performance portability may be used. A runtime system may be employed with higher order parallel primitives (providing control over parallel distribution) may be used and a generalized abstract data structures (e.g., providing control over data distribution and access patterns (from memory or cache)). In this way, the present invention provides for efficient integration of rendering based codes with modern hardware without dedicated porting effort and 2) enables real-time computational rendering feasible for gaming (e.g., a video game) and other virtual world applications, and enables photorealism in computational rendering.

Figure 5:
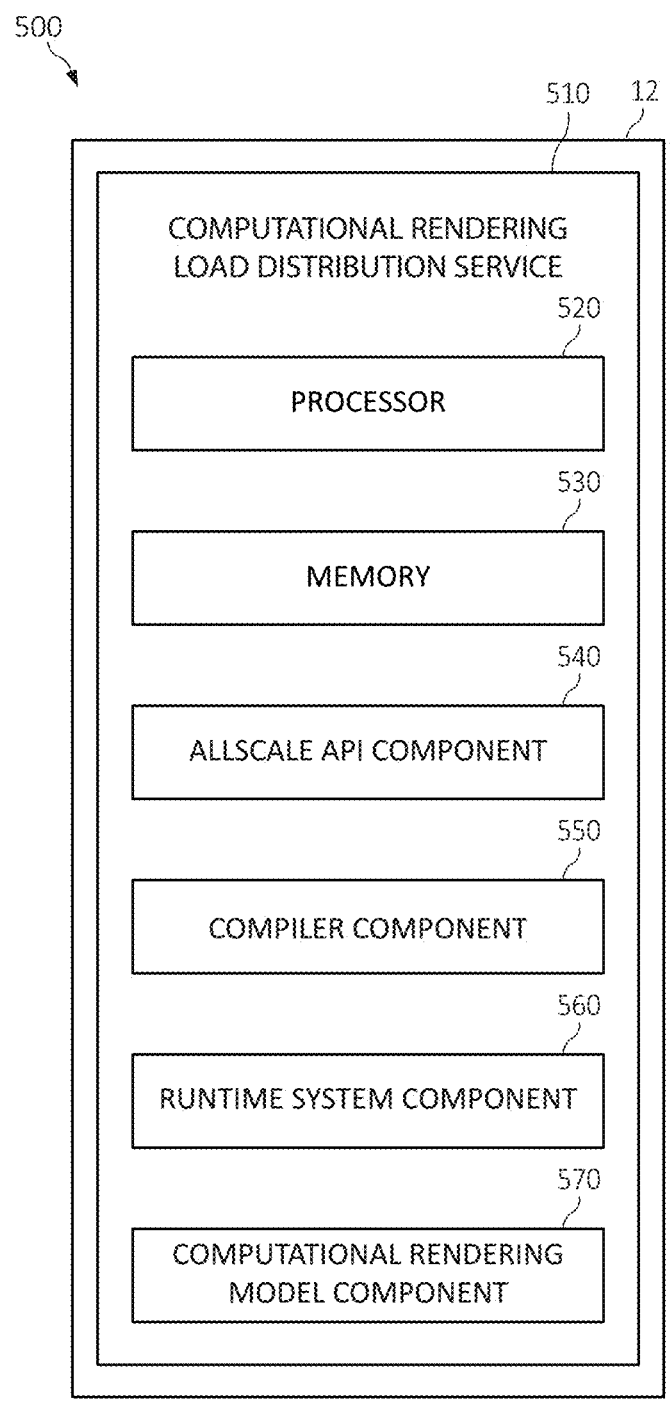
FIG. 5 is an additional block diagram depicting various user hardware and computing components functioning in accordance with aspects of the present invention.

Turning now to FIG. 5, a block diagram depicting exemplary functional components 500 according to various mechanisms of the illustrated embodiments is shown. In one aspect, one or more of the components, modules, services, applications, and/or functions described in FIGS. 1-4 may be used in FIG. 5. A computational rending load distribution service 510 is shown, incorporating processing unit ("processor") 520 to perform various computational, data processing and other functionality in accordance with various aspects of the present invention. The computational rending load distribution service 510 may be provided by the computer system/server 12 of FIG. 1 and/or any computing system being a heterogenous computing system (e.g., one or more CPUs and one or more GPUs). The processing unit 520 may be in communication with memory 530. The computational rending load distribution service 510 may include an API component 540, a compiler component 550, and/or a runtime system component 560, and a computational rending model component 570, each of which may be in communication with each other.

As one of ordinary skill in the art will appreciate, the depiction of the various functional units in computational rending load distribution service 510 is for purposes of illustration, as the functional units may be located within the computational rending load distribution service 510 or elsewhere within and/or between distributed computing components. In one embodiment, by way of example only, the computational rending load distribution service 510 may provide computational rending and dynamic distribution of loads across heterogenous computing structures in computational rendering.

In general, the computational rending load distribution service 510, in association with the computational rendering model component 570 and/or the runtime system component 560, may execute a computational rendering model on a computational rendering to exploit nested recursive parallelism within a heterogenous computing architecture to enable communication overlap, memory transfer, and data and task management.

The API component 540 may be where the code representing the computational rendering model for the heterogenous computing architecture is developed. That is, within the API component 540 may develop an application code.

The compiler component 550 may compile the application code into binaries managed by the heterogenous computing architecture (e.g., one or more CPUs and one or more GPUs). The binaries may include meta information on data structures, computational directives, and communication schema.

The runtime system component 560 may execute the application code across the heterogenous computing architecture using recursive parallelism the enables overlapping of communication and computations by using a plurality of providing synchronization solutions by each of a plurality of sub-domains across computational timesteps.

That is, the computational rendering model component 570 may apply a domain-decomposition schema to a computational rendering model to divide a domain of a computational rendering into a plurality of sub-domains. Within the API component 540 the user may develop each of the plurality of sub-domains and communication schema according to a defined data structures, protocols and routines of the API and provide synchronization instructions by each of the plurality of sub-domains to neighboring domains after each computational timestep. The compiler component 550 analyzes the code developed within the API component 540 and introduces computational pragmas defining recursive primitive usage and data access to the heterogenous computing architecture. The compiler component 550 may generate a plurality of application code versions targeting one or more computing hardware structures.

The runtime system component 560 may manage a plurality of hardware resources and distribution of workload and data structures to one or more compute resources, wherein the heterogenous computing architecture includes one or more central processing units (CPUs) and graphics processing units (GPUs). The runtime system component 560 may also manage a plurality of assignments of tasks to the heterogenous computing architecture, location of data elements, and a plurality of hardware parameters, wherein the heterogenous computing architecture includes one or more central processing units (CPUs) and graphics processing units (GPUs).

Thus, in summary, using the API component 540, a user or computational rendering domain expert), may develops an application code according to API specifications, protocols, routines and data structures. The compiler component 550 may compile the application code developed within the AllScale API into binaries that can be effectively managed and distributed across compute resources by the runtime system component 560. For example, in operation, using the API component 540, a computational rendering expert may adopt a rendering scene and split the rendering scene into a set of independent subdomains (i.e. split it into multiple domains) and provide instructions on synchronizations (e.g. each domain sends its solution to its neighbors to a North, East, West, and a South direction after every computational time step). The API component 540 may develop each subdomain and communication schema according to the defined specifications, protocols and data structures of the API component 540. The application code may be compiled using the compiler component 550, which creates the binaries with meta information on data structures, compute pragmas (e.g. multithreading, GPU-execution) and communication schema.

More specifically, the compiler component 550 analyses recursive primitive usage and data access. The compiler component 550 generates multiple code versions for each step such as, for example, sequential, shared memory parallel, distributed memory parallel, and/or accelerator. The compiler component 550 provides additional information to the runtime system component 560 (e.g. type of recursion and data dependencies and improves dynamic optimization potential). One of the advancement and features provided by the compiler component 550 is that by providing the runtime system component 560 with information on the workload and data decomposition, the compiler component 550 enables a much more flexible (and cache coherent) parallel implementation. Thus, use of the compiler component 550 and the runtime system component 560 provides advantages where traditional parallel implementations only distribute workloads and leave data structure decomposition and management to the user resulting in inefficient Cache access patterns for rendering solutions in situations where the scene is complex (i.e. ray paths move in chaotic directions) or memory consumption is large.

The runtime system 560 then executes the application code across available compute resources (e.g., one or more CPU's, GPU's, etc.) in a recursive parallelism approach that allows overlapping communication and computation by having the solution of subdomains at different computational time steps depending on the synchronization scheme required.

Figure 6:
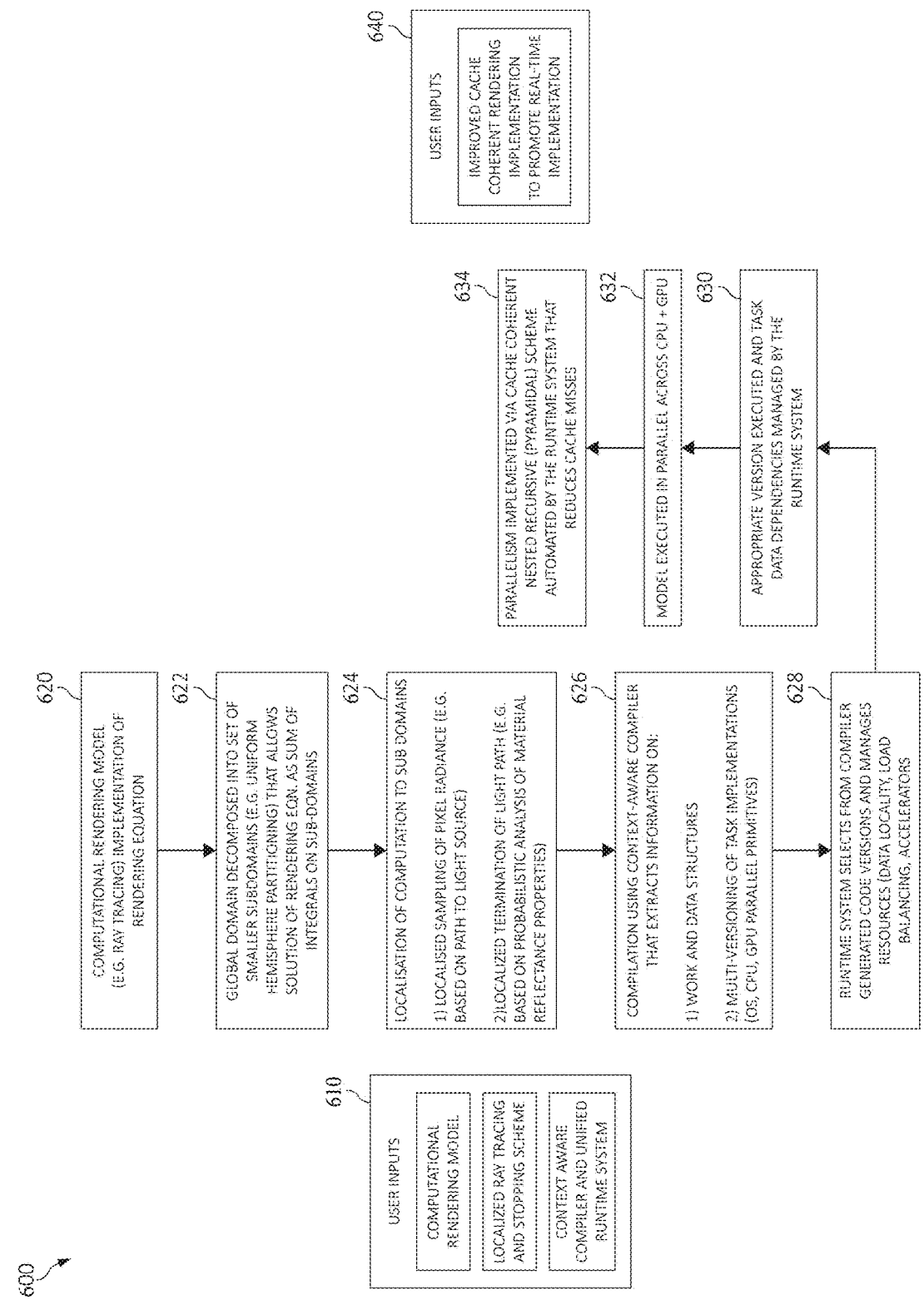
FIG. 6 is a flowchart diagram depicting an additional exemplary method for dynamically distributing of loads across heterogenous computing structures in computational rendering by a processor in which aspects of the present invention may be realized.

Turning now to FIG. 6, a method 600 for dynamically distributing of loads across heterogenous computing structures in computational rendering by a processor is depicted, in which various aspects of the illustrated embodiments may be implemented. That is, FIG. 6 is a flowchart of an additional example method 600 for dynamically distributing of loads across heterogenous computing structures in computational rendering in a computing environment according to an example of the present invention. The functionality 600 may be implemented as a method executed as instructions on a machine, where the instructions are included on at least one computer readable medium or one non-transitory machine-readable storage medium. The functionality 600 may start in block 602.

Starting in block 610, various user inputs may be provided and/or used such as, for example, computational rendering model, localized ray tracing and stopping scheme, and/or a context aware compiler and unified runtime system.

A computational rending model (e.g., ray tracing) implementation of a rendering equation may be used, as in block 620. A global domain (of the computational rending model) may be decomposed into a set of smaller sub-domains (e.g., uniform hemisphere partitioning) that allows a solution of the rending equations as a sum of integrals on sub-domains, as in block 622. A localization of computation to sub-domains may be provided such as, for example, 1) localized sampling of pixel radiance (e.g., based on path to light source), and/or 2) localized termination of light path (e.g., based on probabilistic analysis of material reflectance properties), as in block 624. This can be achieved by for example developing the application code of the computational rendering model according to the specifications, protocols and data structures of the AllScale API described in FIG. 5. The global domain can be broken into a set of subdomains according to the data structures of the AllScale API component and information on space (for example which subdomains depend on each other) and time (for example each computational timestep) synchronization steps can be defined according to the protocols of the AllScale API.

A context-aware compiler may perform a compilation operation that extracts information on 1) work and data structures, and/or 2) multi-versioning of task implementations (e.g., operating system "OS", CPU, GPU, and/or parallel primitives, as in block 626.

A runtime system may select, from the context-aware compiler, generated application code versions and manages multiple resources (e.g., locality, load balancing, and/or accelerators), as in block 628. Based on the multi-version code produced by the AllScale compiler in 626 an appropriate code version may be selected based on the particular hardware resources of the machine (e.g. CPU, GPU, CPU and GPU) and the operating system (e.g. IBM AIX, Linux Ubuntu, Microsoft Windows). Selection of code version is managed by the runtime system based on the compiler generated code and may be executed and task dependencies may be managed by the runtime system, as in block 630. The computational rending model may be executed in parallel across one or more CPUs and/or one or more GPUs (e.g., a heterogenous computing structure), as in block 632.

Parallelism may be implemented via a cache coherent nest recursive (e.g., pyramidal) scheme (e.g., nested recursive parallelism) that is automated by the runtime system that reduces cache misses, as in block 634. The nested recursive parallelism scheme is implemented based on the synchronization (in space and time) requirements of the application code specified in the code developed within the AllScale API and interpreted by the AllScale compiler. One or more outputs may be provided such as, for example, improved cache coherent rendering implementation and more efficient computational execution to promote real-time implementations, as in block 640.

In view of the foregoing, consider the following operations for providing a solution of a computational rending equation. In one aspect, a ray tracing model (e.g., Monte Carlo based ray tracing) may be used such as depicted in the following equation:

$$L_{out}(x,\theta_o)=L_{emit}(x,\theta_o)+L_{reflected}(x,\theta_o),$$

$$L_{out}(x,\theta_o)=L_{emit}(x,\theta_o)+\int L_i(x,\theta_i)f_r(x,\theta_i,\theta_o)(\theta_i{}^*N_x)\partial\omega_i,$$
and $$L_{out}(x,\theta_o)=\text{emitted from object+reflected onto object} \quad (2),$$

where x is the point source of light ray, $\theta$ is the direction of the light ray, and the integral for the reflected light, $L_{reflected}$ is computed over a hemisphere of all "possible" incoming directions, $\theta_i$ based on a particular sampling approach (e.g. Monte Carlo based sampling that is traced from path to light source).

It should be noted that rejection sampling (e.g., rejection sampling approach) may be used. In a physically accurate model, an extremely bright light path may continue for millions of bounces, which is computationally intensive (infeasible). Thus, in one aspect of the present invention, at each bounce in the light path, a probability of rejection may be computed (e.g., locally) based on the reflectance properties of the material currently being sampled (i.e. high probability of termination if light path hits a black surface).

It should be noted that one or more inputs for solving the computational rendering equations may be provided. For example, the inputs may include, but not limited to: 1) a computational mesh and structure Initial estimate of luminosity; 2) external light sources (if any), 3) computational rending model parameters; 4) domain decomposition configuration (e.g., a number of domains in the x and y direction), and/or 5) computer pragmas to define parallelization synchronization dependencies (i.e. local dependencies on sub-domain neighbor in north, south, east and west directions, which can be user defined (e.g. via high performance runtime system) or via source-to-source compilers that hides pragmas from application developer (e.g. via an API).

In view of the foregoing, consider the following operations for parallel partitioning. In one aspect, the domain of a computational rendering may be divided into a number of equal sub-domains of orthogonal spherical triangles. The rendering equation integral may be solved as a sum of the integrals on the subdomains with truncation error, or termination point computed based on the rejection sampling approach. A parallelism implemented via a coarse and fine-grained structure. At a coarse-level, partitions may be distributed across compute resources while fine-grained parallelism allows for distributing and further splitting the computation of solution within each subdomain across compute resources (i.e. within threads and CPUs). Management of task distribution can be via a dynamic scheduler.

Figure 7:
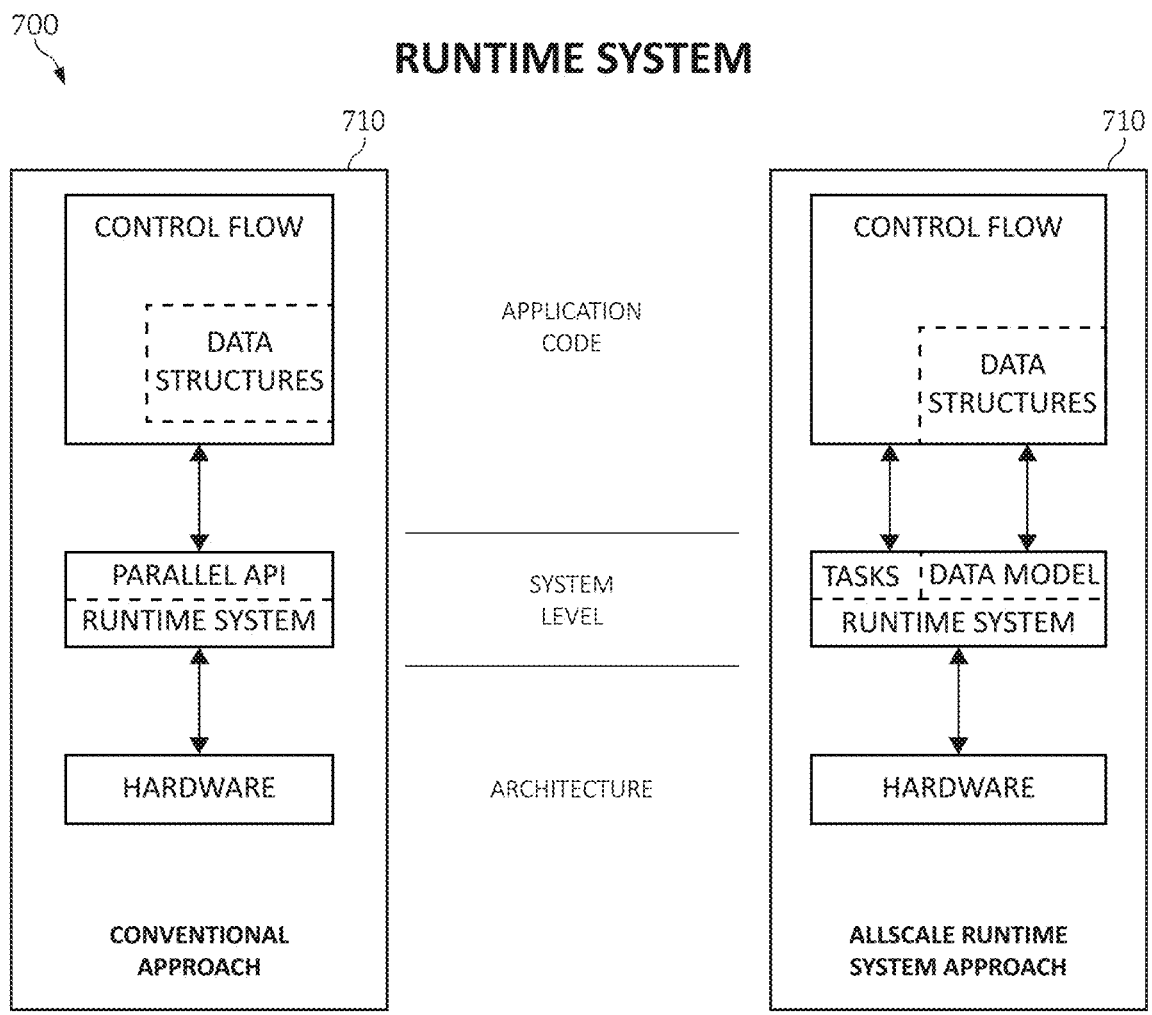
FIG. 7 is a block diagram of a runtime system for dynamically distributing of loads across heterogenous computing structures in computational rendering in accordance with aspects of the present invention.

Turning now to FIG. 7, a block diagram depicts operations of a runtime system 700 for dynamically distributing of loads across heterogenous computing structures. In one aspect, one or more of the components, modules, services, applications, and/or functions described in FIGS. 1-6 may be used in FIG. 7. Repetitive description of like elements employed in other embodiments described herein is omitted for sake of brevity.

As depicted, the runtime system 700 depicts a comparison between conventional runtime systems 710 and an Allscale runtime system 720 of the current invention. In both runtime systems 710 and 720, both include at the application code level the control flow having data structures and hardware at the computing architecture level.

At the system level, however, the conventional runtime systems 710 depicts a parallel API and runtime system. The Allscale runtime system 720 depicts tasks, a data model, and the runtime system at the system level. Thus, the application code with meta-descriptors empowering the runtime system 720 with control over the workload (conventional) and the data structures (e.g., data model). The Allscale runtime system 720 enables dynamic load balancing and data migration and exploits nested recursive parallelism to improve cache coherence. For example, in the load balancing, if there are selected number of compute cores assigned to a solve a computational rendering model, the sub-domains of the computational rendering are divided across the selected number of compute cores for load balancing.

Figure 8:
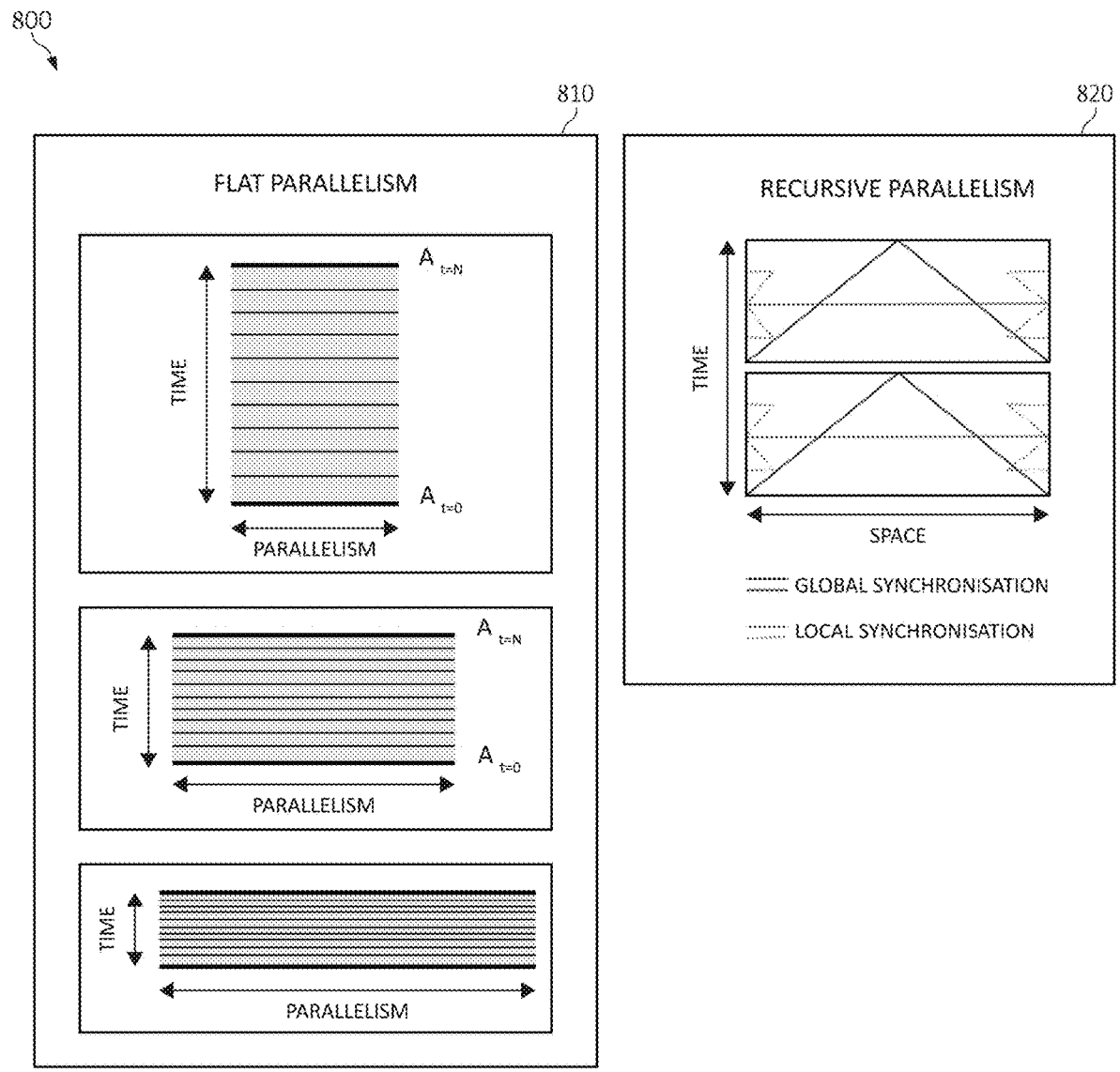
FIG. 8 is a block diagram of a nested recursive parallelism computational stencil that enables dynamically distributing of loads across heterogenous computing structures in computational rendering in accordance with aspects of the present invention.

Turning now to FIG. 8, a diagram 800 depicts flat parallelism 810 and nested recursive parallelism 820 for dynamically distributing of loads across heterogenous computing structures. In one aspect, one or more of the components, modules, services, applications, and/or functions described in FIGS. 1-7 may be used in FIG. 8. Repetitive description of like elements employed in other embodiments described herein is omitted for sake of brevity.

As depicted, flat parallelism 810 is depicted where at time step (t) being equal to zero (e.g., t=0) a synchronization step is performed where there are decomposed domains and at each neighbor (e.g., sub-domain) communicates its solution to its direct neighbor and waits until each subdomain completes the communication step. Thus, at each time step (e.g., $A_{t=0}$, $A_{t=N}$)), the global solution A is updated (e.g., $A_{t=0}$).

It should be noted that, in general, parallelization attempts to minimize the requirements of synchronization. Accordingly, with nested recursive parallelism 820, the global domain is divided into a set of space-time domain and communication is achieved across the triangular/pyramid type pathway where synchronization to be propagated through the domain. This enables the synchronization of solution for each subdomain to be reduced to that enforced by its direct neighbor allowing for a more efficient computational execution (e.g. instead of waiting for every subdomain to complete communication and proceed, each subdomain need only wait on its direct neighbor). The nested recursive parallelism 820 allows for features of the ray tracing algorithm (e.g., no global synchronization necessary), together with localized sampling and stopping implementations make a good fit for nested recursive parallelism. Together, with runtime control over data structures, it enables an automated reordering of work to improve cache performance. That is, by localizing a solver to each sub-domain and synchronizing between subdomains, the nested recursive parallelism 820 may approximate the correct global solution while eliminating global synchronization thereby making implicit solvers feasible within recursive parallel paradigm and load balancing may be managed at sub-domain level.

Figure 9:
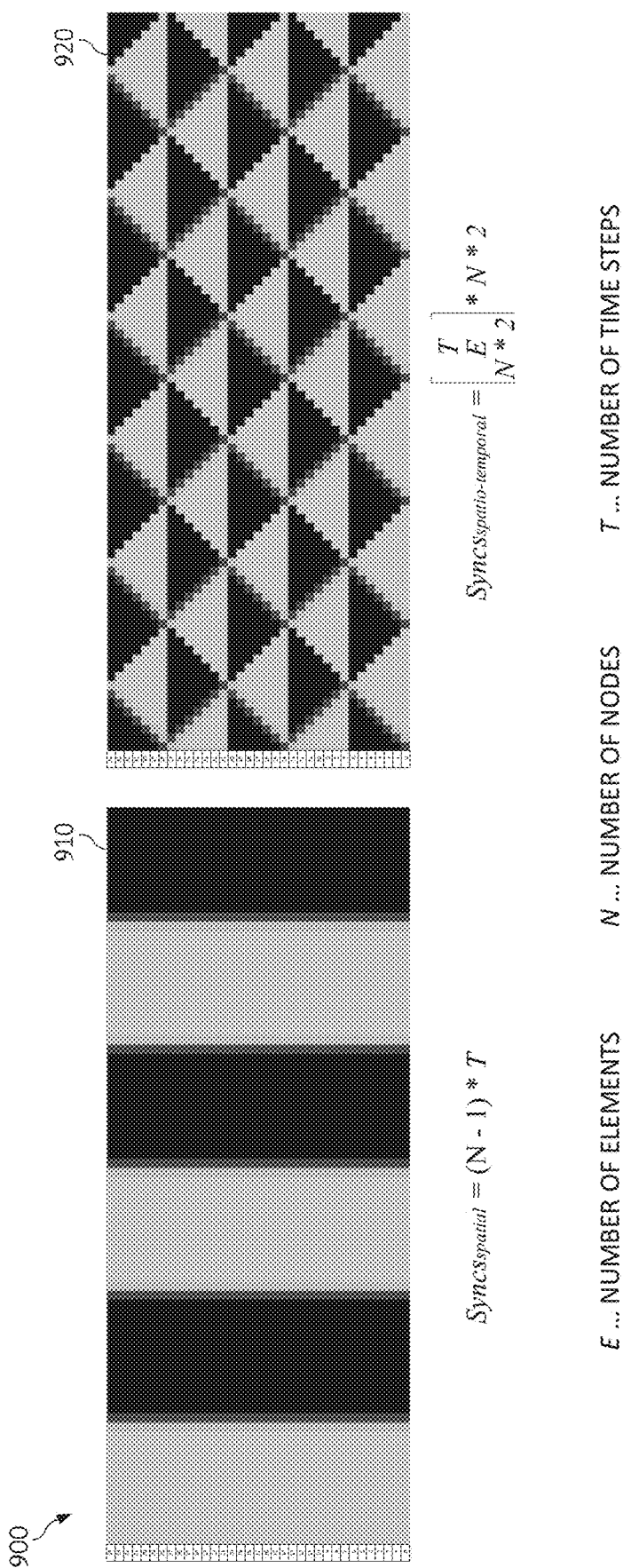
FIG. 9 is a diagram of space-time decomposition of stencil codes enabled by nested recursive parallelism using an API in accordance with aspects of the present invention.

Turning now to FIG. 9, a diagram 900 depicts diagram of space-time decomposition of stencil codes enabled by nested recursive parallelism using an API. In one aspect, one or more of the components, modules, services, applications, and/or functions described in FIGS. 1-8 may be used in FIG. 9. Repetitive description of like elements employed in other embodiments described herein is omitted for sake of brevity.

Spatial synchronization ("$Syns_{spatial}$") is achieved according to the following formula:

$$Syns_{spatial} = (N-1)*t, \quad (3)$$

But stencil 920 depicts the synchronization across both time and space ("$Syns_{spatio-temporal}$") is achieved according to the following formula:

$$Syns_{spatio-temporal} = \left\lceil \frac{t}{\frac{E}{N*2}} \right\rceil * (N*1), \quad (4)$$

Where E is the number of elements, N is the number of nodes, and t is the number of time steps. Thus, the nested recursive parallelism using an API for the space-time decomposition of stencil codes: 1) allows for increased management efficiency of memory cache access, 2) reduces parallel synchronization requirements (e.g., linearly as a function of the depth E, a "height" in the time dimension of each triangle) thereby performance, and/or 3) maps naturally to multiple levels of hardware ("HW") parallelism (e.g., node, socket, accelerator).

Figure 10:
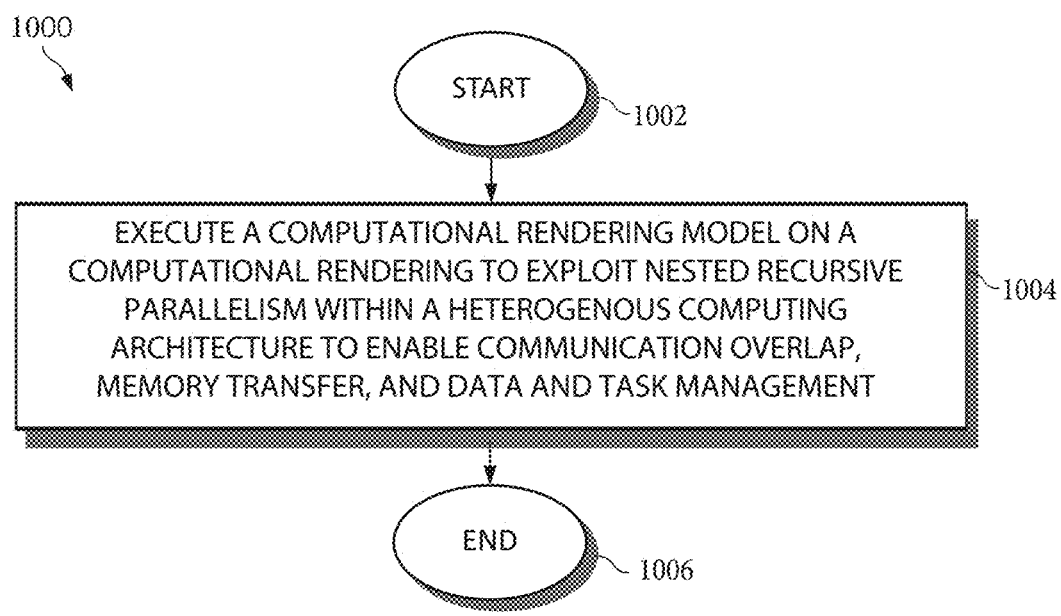
FIG. 10 is a flowchart diagram depicting an additional exemplary method for dynamically distributing of loads across heterogenous computing structures in computational rendering by a processor; again, in which aspects of the present invention may be realized.

Turning now to FIG. 10, a method 1000 for dynamically distributing of loads across heterogenous computing structures in computational rendering is depicted, in which various aspects of the illustrated embodiments may be implemented. That is, FIG. 10 is a flowchart of an additional example method 900 for dynamically distributing of loads across heterogenous computing structures in computational rendering in a computing environment according to an example of the present invention. The functionality 1000 may be implemented as a method executed as instructions on a machine, where the instructions are included on at least one computer readable medium or one non-transitory machine-readable storage medium. The functionality 1000 may start in block 1002.

A computational rendering model on a computational rendering to exploit nested recursive parallelism within a heterogenous computing architecture to enable communication overlap, memory transfer, and data and task management, as in block 1004. The computational rendering model is developed for the heterogenous computing architecture. The functionality 1000 may end in block 1006.

In one aspect, in conjunction with and/or as part of at least one block of FIG. 10, the operation of 1000 may include one or more of each of the following. The operation of 1000 may 1) develop an application code according to the specifications, protocols and data structures of AllScale application programing interface (API), 2) compile the application code into a plurality of binaries managed by the heterogenous computing architecture and the plurality of binaries include meta information on data structures, computational directives, and communication schema, and 3) execute the application code across the heterogenous computing architecture using recursive parallelism the enables overlapping of communication and computations by using a plurality of synchronization solutions by each of the plurality of sub-domains after each computational timestep.

The operation of 1000 may apply the computational rendering model to divide a domain of a computational rendering into a plurality of sub-domains, develop, within an AllScale application programing interface (API), each of the plurality of sub-domains and communication schema according to a defined data structures of the AllScale API, and provide synchronization instructions by each of the plurality of sub-domains to neighboring domains after each computational timestep.

The operation of 1000 may define parallel primitives using an All scale application programming interface ("API"), and analyze recursive primitive usage and data access to the heterogenous computing architecture. The operation of 1000 may generate a plurality of application code versions targeting one or more computing hardware structures.

The operation of 1000 may manage a plurality of hardware resources and distribution of workload and data structures to one or more compute resources, wherein the heterogenous computing architecture includes one or more central processing units (CPUs) and graphics processing units (GPUs), and/or manage a plurality of assignments of tasks to the heterogenous computing architecture, location of data elements, and a plurality of hardware parameters, wherein the heterogenous computing architecture includes one or more central processing units (CPUs) and graphics processing units (GPUs).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for dynamically distributing loads in computational rendering, by a processor, comprising:
executing a computational rendering model on a computational rendering to exploit nested recursive parallelism within a heterogeneous computing architecture to enable communication overlap, memory transfer, and data and task management, wherein the computational rendering model is developed for the heterogeneous computing architecture using developed application code compiled by a compiler, and wherein the compiler generates multiple code versions for each computational timestep specifically optimized to one or more hardware structures of the heterogeneous computing architecture according to contextual data location and hardware parameters used during runtime;

developing the application code according to an application programing interface (API);

compiling, by the compiler, the application code into a plurality of binaries managed by the heterogeneous computing architecture, wherein the plurality of binaries include meta information on data structures, computational directives, and communication schema; and executing the application code across the heterogeneous computing architecture using recursive parallelism that enables overlapping of communication and computations by using a plurality of synchronization solutions provided by each of a plurality of sub-domains after each computational timestep, wherein a localization of computation for each of the plurality of sub-domains is performed inclusive of a localized sampling of pixel radiance and a localized termination of a light path, based on a probabilistic analysis of material reflectance properties, of the computational rendering.

2. The method of claim 1, further including:

applying the computational rendering model to divide a domain of a computational rendering into the plurality of sub-domains;

developing, within the API, each of the plurality of sub-domains and communication schema according to a defined specification, protocol, and data structure of the API; and providing synchronization instructions by each of the plurality of sub-domains to neighboring domains after each computational timestep.

3. The method of claim 1, further including:

defining parallel primitives within using the API, wherein the API comprises an Allscale API; and analyzing recursive primitive usage and data access to the heterogeneous computing architecture using the compiler.

4. The method of claim 1, further including managing a plurality of hardware resources and distribution of workload and data structures to one or more compute resources, wherein the heterogeneous computing architecture includes one or more central processing units (CPUs) and graphics processing units (GPUs).

5. The method of claim 1, further including managing a plurality of assignments of tasks to the heterogeneous computing architecture, location of data elements, and a plurality of hardware parameters, wherein the heterogeneous computing architecture includes one or more central processing units (CPUs) and graphics processing units (GPUs).

6. A system for dynamically distributing loads in computational rendering in a computing environment, comprising:

one or more computers with executable instructions that when executed cause the system to:

execute a computational rendering model on a computational rendering to exploit nested recursive parallelism within a heterogeneous computing architecture to enable communication overlap, memory transfer, and data and task management, wherein the computational rendering model is developed for the heterogeneous computing architecture using developed application code compiled by a compiler, and wherein the compiler generates multiple code versions for each computational timestep specifically optimized to one or more hardware structures of the heterogeneous computing architecture according to contextual data location and hardware parameters used during runtime;

develop the application code according to an application programing interface (API);

compile, by the compiler, the application code into a plurality of binaries managed by the heterogeneous computing architecture, wherein the plurality of binaries include meta information on data structures, computational directives, and communication schema; and execute the application code across the heterogeneous computing architecture using recursive parallelism that enables overlapping of communication and computations by using a plurality of synchronization solutions provided by each of a plurality of sub-domains after each computational timestep, wherein a localization of computation for each of the plurality of sub-domains is performed inclusive of a localized sampling of pixel radiance and a localized termination of a light path, based on a probabilistic analysis of material reflectance properties, of the computational rendering.

7. The system of claim 6, wherein the executable instructions:

specify the computational rendering model to divide a domain of a computational rendering into the plurality of sub-domains;

develop, within the API, each of the plurality of sub-domains and communication schema according to a defined specification, protocol, and data structure of the API; and provide synchronization instructions by each of the plurality of sub-domains to neighboring domains after each computational timestep according to the protocols of the API.

8. The system of claim 6, wherein the executable instructions:

define parallel primitives using the API, wherein the API comprises an Allscale API; and analyze recursive primitive usage and data access to the heterogeneous computing architecture using the compiler.

9. The system of claim 6, wherein the executable instructions manage a plurality of hardware resources and distribution of workload and data structures to one or more compute resources, wherein the heterogeneous computing architecture includes one or more central processing units (CPUs) and graphics processing units (GPUs).

10. The system of claim 6, wherein the executable instructions manage a plurality of assignments of tasks to the heterogeneous computing architecture, location of data elements, and a plurality of hardware parameters, wherein the heterogeneous computing architecture includes one or more central processing units (CPUs) and graphics processing units (GPUs).

11. A computer program product for dynamically distributing loads in computational rendering in a computing environment, the computer program product comprising a non-transitory computer-readable storage medium having computer-readable program code portions stored therein and executed by a processor, the computer-readable program code portions comprising:

an executable portion that executes a computational rendering model on a computational rendering to exploit nested recursive parallelism within a heterogeneous computing architecture to enable communication overlap, memory transfer, and data and task management, wherein the computational rendering model is developed for the heterogeneous computing architecture using developed application code compiled by a compiler, and wherein the compiler generates multiple code versions for each computational timestep specifically optimized to one or more hardware structures of the heterogeneous computing architecture according to contextual data location and hardware parameters used during runtime;

an executable portion that develops the application code according to an application programing interface (API);

an executable portion that compiles, by the compiler, the application code into a plurality of binaries managed by the heterogeneous computing architecture, wherein the plurality of binaries include meta information on data structures, computational directives, and communication schema; and an executable portion that executes the application code across the heterogeneous computing architecture using recursive parallelism that enables overlapping of communication and computations by using a plurality of synchronization solutions provided by each of a plurality of sub-domains after each computational timestep, wherein a localization of computation for each of the plurality of sub-domains is performed inclusive of a localized sampling of pixel radiance and a localized termination of a light path, based on a probabilistic analysis of material reflectance properties, of the computational rendering.

12. The computer program product of claim 11, further including an executable portion that:

applies the computational rendering model to divide a domain of a computational rendering into the plurality of sub-domains;

develops, within the API, each of the plurality of sub-domains and communication schema according to a defined specification, protocol, and data structure of the API; and provides synchronization instructions by each of the plurality of sub-domains to neighboring domains after each computational timestep according to the protocols of the API.

13. The computer program product of claim 11, further including an executable portion that:

define parallel primitives using the API, wherein the API comprises an Allscale API; and analyze recursive primitive usage and data access to the heterogeneous computing architecture using the compiler.

14. The computer program product of claim 11, further including an executable portion that:

manages a plurality of hardware resources and distribution of workload and data structures to one or more compute resources, wherein the heterogeneous computing architecture includes one or more central processing units (CPUs) and graphics processing units (GPUs); and manages a plurality of assignments of tasks to the heterogeneous computing architecture, location of data elements, and a plurality of hardware parameters, wherein the heterogeneous computing architecture includes one or more central processing units (CPUs) and graphics processing units (GPUs).

* * * * *